US011548026B2

(12) United States Patent
Laurberg et al.

(10) Patent No.: US 11,548,026 B2
(45) Date of Patent: Jan. 10, 2023

(54) DISPENSER TOOL, ROBOT SYSTEM WITH DISPENSER TOOL AND METHOD FOR DISPENSING VISCOUS MATERIAL ONTO WIND TURBINE BLADE SURFACE

(71) Applicant: ROPE ROBOTICS APS, Åbyhøj (DK)

(72) Inventors: Hans Laurberg, Aarhus C (DK);
Martin Huus Bjerge, Kibaek (DK);
André Mikkelsen, Ryomgård (DK);
Troels Askholm Andersen, Lystrup (DK); Matthias Stefansson, Højbjerg (DK)

(73) Assignee: ROPE ROBOTICS APS, Åbyhøj (DK)

( * ) Notice: Subject to any disclaimer, the term of this patent is extended or adjusted under 35 U.S.C. 154(b) by 198 days.

(21) Appl. No.: 16/753,085

(22) PCT Filed: Oct. 2, 2018

(86) PCT No.: PCT/DK2018/050246
§ 371 (c)(1),
(2) Date: Apr. 2, 2020

(87) PCT Pub. No.: WO2019/068299
PCT Pub. Date: Apr. 11, 2019

(65) Prior Publication Data
US 2020/0238324 A1 Jul. 30, 2020

(30) Foreign Application Priority Data

Oct. 2, 2017 (DK) .......................... PA 2017 70746

(51) Int. Cl.
*B05B 13/04* (2006.01)
*B25J 11/00* (2006.01)
(Continued)

(52) U.S. Cl.
CPC ............ *B05B 13/0431* (2013.01); *B05B 1/30* (2013.01); *B05B 12/1463* (2013.01);
(Continued)

(58) Field of Classification Search
CPC .. B05B 13/0431; F03D 80/50; B25J 11/0075;
B25J 11/0085; B25J 15/0019;
(Continued)

(56) References Cited

U.S. PATENT DOCUMENTS 8,733,417 B2    5/2014  Hamlyn et al.
2002/0113198 A1* 8/2002 Bieman ................. B05C 5/0216
                                                  250/221

(Continued)

FOREIGN PATENT DOCUMENTS

GB      2518346 A      3/2015
KR   20140001444 A     1/2014
(Continued)

*Primary Examiner* — Jermie E Cozart
(74) *Attorney, Agent, or Firm* — Dykema Gossett PLLC

(57) ABSTRACT

A dispenser tool (42) is provided with multiple cartridges for dispensing viscous material onto the surface (5') of a wind turbine blade (5). The dispenser tool (42) is advantageously part of a robot system used to work the surface (5') of the blade (5). The system is configured for bringing the nozzle of a selected cartridge into the vicinity of the surface (5') and orienting the dispenser tool (42) relatively to the surface (5') such that the nozzle (46) of the corresponding selected cartridge (44) is at the surface (5') for providing viscous material onto the surface (5') from the selected cartridge (44) while moving the nozzle (46) along the surface (5').

18 Claims, 11 Drawing Sheets

(51) Int. Cl.
  *B25J 15/00*  (2006.01)
  *F03D 80/50*  (2016.01)
  *F03D 80/55*  (2016.01)
  *B05B 1/30*  (2006.01)
  *B05B 12/14*  (2006.01)
  *B25J 19/02*  (2006.01)

(52) U.S. Cl.
  CPC ........ *B25J 11/0075* (2013.01); *B25J 11/0085* (2013.01); *B25J 15/008* (2013.01); *B25J 15/0019* (2013.01); *B25J 19/023* (2013.01); *F03D 80/55* (2016.05); *B25J 15/0033* (2013.01); *B25J 15/0066* (2013.01); *F03D 80/50* (2016.05)

(58) Field of Classification Search
  CPC .... B25J 15/0033; B25J 15/066; B25J 15/008; B25J 19/023
  See application file for complete search history.

(56) References Cited

U.S. PATENT DOCUMENTS

| | | |
|---|---|---|
| 2009/0169734 A1 | 7/2009 | Teichert |
| 2009/0229760 A1 | 9/2009 | Hamlyn et al. |
| 2011/0318496 A1 | 12/2011 | Jensen et al. |
| 2013/0289766 A1 | 10/2013 | Hafenrichter et al. |
| 2015/0135459 A1 | 5/2015 | Lee et al. |
| 2015/0267688 A1 | 9/2015 | Krampe |
| 2017/0106924 A1* | 4/2017 | Hafenrichter ........ B25J 11/0075 |
| 2017/0239682 A1 | 8/2017 | Muller |

FOREIGN PATENT DOCUMENTS

| | | |
|---|---|---|
| WO | 2011107087 A2 | 9/2011 |
| WO | 2018/010749 A1 | 1/2018 |

* cited by examiner

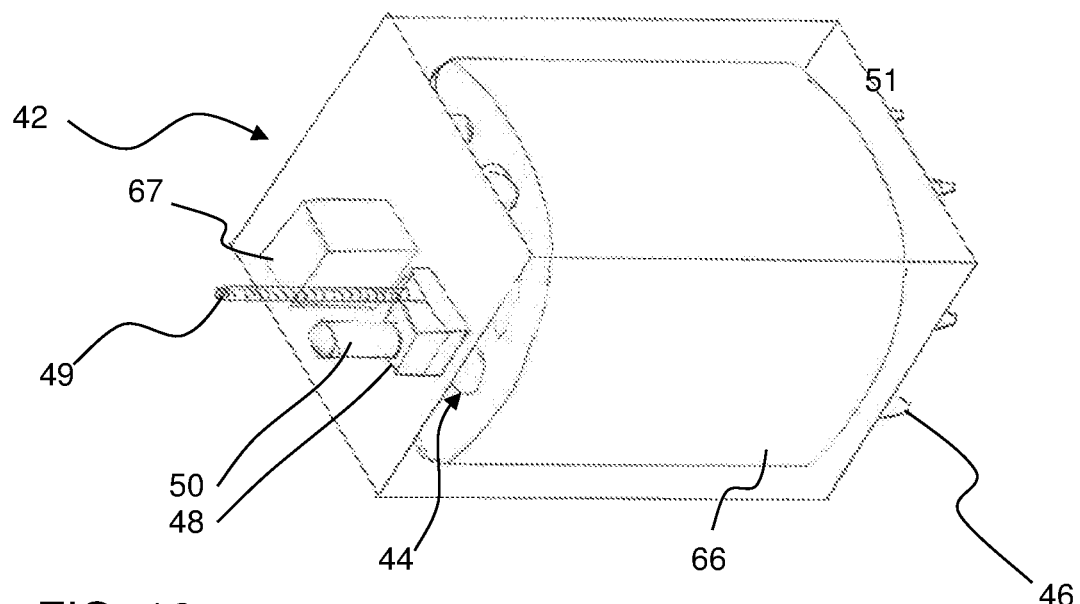
FIG. 10a
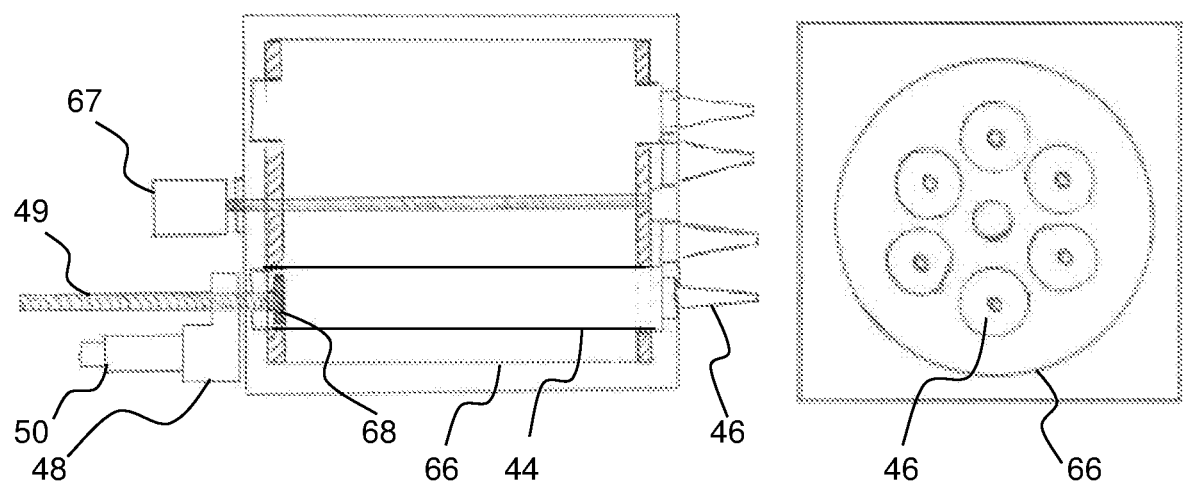
FIG. 10b
FIG. 10c

DISPENSER TOOL, ROBOT SYSTEM WITH DISPENSER TOOL AND METHOD FOR DISPENSING VISCOUS MATERIAL ONTO WIND TURBINE BLADE SURFACE

CROSS-REFERENCE TO RELATED APPLICATIONS

This application is a national stage filing based upon International PCT Application No. PCT/DK2018/050246, filed 2 Oct. 2018, which claims the benefit of priority to Denmark application No. PA 2017 70746, filed 2 Oct. 2017.

FIELD OF THE INVENTION

The present invention relates to a system with a robot, for example for working of vertical surface or inclined surface, in particular of a wind turbine, and a method of its operation. It also relates to use of the system and an operation site with such system as well as a repair tool for such wind turbine blade.

BACKGROUND OF THE INVENTION

For cleaning or painting or maintenance of wind turbines blades, the prior art discloses a number of systems for servicing outer components of wind turbines.

International patent application WO2004/092577 discloses a movable work platform for workers. The platform is hanging on a cable from at hoist in the nacelle and is attached to an arm that engages with the tower for gripping the tower or for sliding along the outside of the tower when lifting or lowering the platform. The distance between the tower and the platform can be adjusted by extending the arm.

In order to avoid personnel, automated devices have been proposed. An example is disclosed in European patent application EP2281770 in which multiple unmanned climbing vehicles are provided around the tower and pressed against the tower surface by wires around the tower and the vehicles. A friction pad on an arm of each vehicle is repeatedly extended from the respective vehicle and pressed against the tower surface below the vehicles for pushing the vehicles upwards. A maintenance tool is provided below the vehicles, for example for cleaning and painting.

Other systems, which are unmanned, are provided on wires fastened to the nacelle or the rotor. Examples are Korean patent applications KR20130114913, KR20140001412, KR20140001444, KR20120067128, KR20140000370, and KR20140000383, Korean patent KR101324974B1, as well as US patent application US2011318496A. The latter system comprises a fluid sprayer which is connected by a tube to a tank on a ground based lorry for providing the fluid to the sprayer. These systems are relatively expensive in production due to their size and also expensive to transport to the site. The system in US2011318496A has the additional problem of a tube extending from the robot downwards.

Smaller systems include robots that are sliding or crawling along the turbine blades while in horizontal orientation, for example as disclosed in International patent application WO2013/032166 equivalent to US2015/135459, US patent application US2010132137 and equivalent European patent application EP2752621, or Chinese utility model CN205129861U. Maintenance of an aircraft wing by a crawling robot is disclosed in US2013/0289766.

Another type of climbing robots for horizontal or vertical walls is disclosed in U.S. Pat. No. 5,551,525. Two similar arms with suction cups are connected to each other by a hinge, and one arm is fastened to a location while the other is moved and vice versa. A further type of climbing robot is disclosed in international patent application WO00/75000 in which a vehicle comprises an endless belt track with suction chambers for sucking the track against a surface. Optionally, a movable arm with a suction cup at its remote end is attached to the vehicle. When the arm is properly attached to the surface, it is capable of lifting the vehicle over obstacles.

None of these systems have been commercially successful. It appears that the market is still awaiting a small scale technical solution which is versatile, involves low-cost production, and is easy to transport from site to site.

For wind turbines among others, a vacuum stepper robot is disclosed in US patent application US20140519169. The robot comprises a base with multiple vacuum suction cups that move relatively to each other alternatingly.

International patent application WO2012/158042 discloses a cleaning vehicle constructed as a caterpillar with magnetic tracks for crawling up on a metallic tower of the wind turbine. A security line is used as a safety feature. Such robot is not useful for wind turbine wings, as there is no metal on which the magnetic feet are working.

A climbing and inspection device for turbine blades is disclosed in US patent application US2011/0138937. A caterpillar traction system comprising a vacuum suction system is used for holding the vehicle to the tower, optionally assisted by a wire system. The vehicle is moved along the tower with a camera up along the tower for inspection of the blade when it is oriented in parallel with the tower.

For robots in general, relatively recent developments focus on synthetic dry adhesive in an attempt to mimic the feet of geckos, seeing that geckoes can crawl along vertical walls as well as upside down on ceilings. Examples of dry adhesives are disclosed in U.S. Pat. No. 7,762,362 and German patent application DE201510101290. Micro-structured dry adhesives are generally described and discussed in US2008/169003, US2014272272, and U.S. Pat. No. 8,882, 996, referring to electrostatic and Van der Waals forces. In US2014272272, it is explained with reference to gecko feet that dry adhesives commonly use asymmetric micro-structured hairs that create a high area of contact when loaded in a preferred direction. When the load is reversed, the adhesives release from the surface with near zero force.

For gripping elements by an industrial robot, European patent EP2735408B1 discloses a gripper that comprises a fin-ray element. Ray-fin elements are also disclosed for windscreen wipers, for examples as disclosed in US patent application US20177232935 and European patent application EP3172098. A similar constructional principle is disclosed in US2012/0222230.

For dispensing viscous material, prior art systems are disclosed in general, for example as disclosed in US 2009/0229760, and particularly for wind turbine blades, for example in US017/0239682.

For wind turbines in particular, there is a steady need for improvements with respect to servicing, inspection and repair of turbine blades.

DESCRIPTION/SUMMARY OF THE INVENTION

It is an objective of the invention to provide an improvement in the art. In particular, it is an objective to provide a system which is simple to use for repair of surfaces, especially surfaces of wind turbine blades, and which requires low cost in fabrication and which has a high level of versatility and adaptivity. This objective is achieved with a tool and a robot system as well as method for working a surface as explained in more detail in the following. As it will appear in the following, further advantages include reliability of the system, robustness, and low weight. The objective is also achieved by an operation site with such system as explained below. It is a further objective to provide methods for operating of the systems as well as advantageous use of such a system, especially of the various embodiments described.

The system comprises an unmanned robot. The robot has a base and an arm extending from the base. The robot can be of various type, for example with various legs or arms crawling on surfaces or according to other principles in the prior art. An example of a robot on a wire is explained in more detail below.

The term "an arm" is used with the meaning of "at least one arm". Multiple arms can be used for similar function, or multiple arms can have multiple functions. In the case of multiple arms, typically, the arms have different functions. For example, the different arms are used for holding and operating different tools. In cases where multiple arms are used with different functions, it is expressed as "an arm" and "a further arm"; in this case, the term "an arm" comprises one or more arms with the specific function described for this particular arm, and the term "further arm" comprises one or more further arms with the specific function of this particular "further arm".

A further arm can be used for holding and operating various tools. However, in some cases, in order to minimize weight and reduce production cost, only a single arm is used on the base.

The arm comprises a remote end, typically with a coupling for attachment of a tool for inspecting and/or working the surface. The arm is configured for movement of the remote end relatively to the base in order to adjust the location and orientation of the tool at the remote end.

The arm is moveable relatively to the base and, thus, has at least one degree of freedom relatively to the base. Typically, however, the arm has multiple degrees of freedom for movement relatively to the base, for example 2, 3, 4, 5, 6, 7, or 8, degrees of freedom with respect to movement relatively to the base. For example, this is achieved by a corresponding number of rotational actuators with one degree of freedom each. However, a single actuator can be provided with more than one degree of freedom, for example when provided as cooperating half spheres.

The robot is provided with at least one tool configured for at least one of inspecting and working the surface. Working potentially includes cleaning, repairing, or painting.

For repairing the surface of a turbine blade, especially the edge of a turbine blade, it is a useful procedure to dispense filler material to the surface, which is subsequently spread over and along the surface, for example the edge.

For this purpose, a dispenser tool is provided for dispensing the filler material. The dispenser tool can also be used to dispense other viscous materials, for example glue or paint onto the surface.

For example, for working, the dispenser tool is attached to the remote end of the arm, for example permanently attached to the arm, or attached to the remote end of the arm via a coupling for easy attachment and removal.

In a practical embodiment, the dispenser tool is holding multiple cartridges containing viscous material, each cartridge comprising a respective nozzle. For example, the cartridges are of the type comprising a tubular wall and a nozzle at one end of the tubular wall and an and cap remote from the nozzle arranged slidable inside the tubular wall and configured for push of the slidable cap towards the nozzle for expelling viscous material from inside the cartridge and out of the cartridge through the nozzle when the end cap is pushed towards the nozzle.

The dispenser tool comprises at least one dispenser actuator for dispensing viscous material from the cartridge. For example, in the case of the specific cartridge type described above, the actuator is driving a dispenser rod against the end cap and the dispenser rod moving with the end cap for pushing the end cap towards the nozzle under control of the dispenser actuator. Optionally, such dispenser rod is part of a spindle which is driven by a motor in the actuator.

For example, in operation, the arm is bringing the nozzle of the selected cartridge into the vicinity of the surface and orienting the dispenser tool relatively to the surface such that the nozzle of the corresponding selected cartridge is at the surface, for example closer to the surface than the nozzles of the other cartridges in the dispenser tool. Then, the dispenser is activated and viscous material is provided onto the surface of the blade from the selected cartridge while moving the nozzle along the surface.

In some embodiments, the system dispenses from a single nozzle at a time. In other embodiments, the system is configured for dispensing from more than one nozzle at a time. The latter can be useful when dispensing viscous material over larger surfaces.

For example, the actuator is of the type that is driven by an electrical motor. Optionally, electricity for an electrical motor in the dispenser tool is provided through an electrical connector of the dispenser tool. Alternatively, the dispenser tool comprises a battery. However, it is, in principle, also possible to use a hydraulic or pneumatic drive as an actuator.

In some embodiments, the dispenser tool comprises a cartridge housing in which the cartridges are arranged, for example arranged with the respective nozzles side-by-side. The robot is thus configured for at least one active dispensing orientation of the dispenser tool relatively to the surface for any selected cartridge, in which active dispensing orientation the nozzle of the selected cartridge is at the surface, for example closer to the surface than the nozzles of the other cartridges in the dispenser tool.

For example, in this embodiment in operation, after selection of a cartridge, the dispenser tool is oriented relatively to the surface such that the nozzle of the corresponding selected cartridge is at the surface, for example closer to the surface than the nozzles of the other cartridges, in the dispenser tool and then activating the dispenser actuator and driving the end cap towards the nozzle of the selected cartridge. Alternatively, the end caps from more than one cartridge are driven in order to dispense from more than one cartridge simultaneously.

Optionally, the cartridges are arranged stationary in the dispenser, and the dispenser comprises a dispenser actuator for each cartridge and is configured for selectively driving the particular dispenser actuator for the selected cartridge while the other dispenser actuators are not activated. For example, in this embodiment in operation, only one of the dispenser actuators is activated after selection of the corresponding cartridge and expelling viscous material only from the selected cartridge onto the surface.

Alternatively, the dispenser tool comprises a moving mechanism for moving the selected cartridge in the dispenser from an inactive position to an active position, wherein the dispenser is prevented from dispensing viscous material from the selected cartridge in the inactive position, and wherein the selected cartridge is aligned with the dispenser actuator only in the active position for dispensing viscous material from the selected cartridge. For example, in this embodiment in operation, after selection of a cartridge that is in an inactive position the selected cartridge is moved from the inactive position to the active position, and then the dispenser actuator is activated for dispensing viscous material from the selected cartridge. An example is a revolver-type arrangement of the cartridges, where a drum magazine that holds the cartridges rotates the cartridges into the active position where a cartridge is aligned with a dispenser actuator.

In order to spread the filler or other viscous material properly over the surface of the blade, a spreader tool is provided for spreading viscous material on the curved surface, for example an edge, of a wind turbine blade. For working, the spreader tool is attached to the remote end of the arm, for example permanently attached to the arm, or attached to the remote end of the arm via a coupling for easy attachment and removal. It comprises a bendable spreader wing and a bending mechanism that comprises an actuator for deforming the spreader wing into a variable curved structure. By the actuator, the bending curve of the spreader wing is adjusted to the curvature of the curved section.

The term "a bendable spreading wing" is to be understood as "at least one bendable spreading wing", and an embodiment will be explained below with two bendable spreader wings.

In practice, the robot is located at the curved section, and viscous material is provided onto the curved section, for example with a dispenser as described above. Then, the spreader tool is oriented relatively to the curved section by the arm, and the spreader wing is adjusted to the curvature of the curved section by the actuator. By moving the spreader tool along the curved section by the arm keeping the proper orientation of the spreader tool, the viscous material is dragged along the curved section and the viscous material spread on the curved section.

For example, adjustment of the orientation and/or curvature of the spreader wing or wings to the curvature of the curved section is made during the spreading. This is especially useful if the direction and/or curvature changes along the moving path of the spreader tool.

The dispenser tool and the spreader tool are potentially operated by the same robot. For example two different arms are sued for the two tools. Alternatively, the same arm is used and the dispenser is detached from the arm and the spreader tool attached to the arm, for example attached to the coupling at the remote end of the arm. In an alternative embodiment, one robot is operating the dispenser tool and another robot is operating the spreader tool.

In some embodiments, a flat flexible band is attached to the spreader wing for abutting the curved section and for dragging viscous material along the curved section during movement of the spreader tool along the curved section by the arm.

For example, the spreader wing is constructed according to a fin-ray principle with a first strut and a second strut. The two struts constitute two long sides with an acute angle between the struts. A plurality of support beams connect the first strut with the second strut in rotational connections; wherein the second strut is connected to the actuator. In practice, the fin-ray structure is forced into a bending configuration by moving the second strut relatively to the first strut by the actuator.

In some concrete embodiments, the struts are formed by a first and a second chain, respectively, and the actuator is connected to the second chain, which is moved by the actuator relatively to the first chain, forcing the first chains into a bending shape similarly to the shape of the blade at the curved section. For example, the first chain attains a shape similarly to the shape of the blade at the edge. Optionally, the rotational connections for the support beams are combined with the rotational connections of the chain links.

For the embodiment with the flexible band, this band would be attached to the first chain and be forced into a bending shape in combination with the first chain similarly to the shape the curved section, for example the shape of the blade at the edge.

In some embodiments, the spreader tool comprises a second spreader wing. For example, the two spreader wings are extending from a centre region in opposite directions; wherein each of the two the spreader wings are connected to the bending mechanism for adjusting the bending curve of the combination of the two spreader wings to the curvature of the curved section. In practice, the method comprises orienting the spreader tool relatively to the curved section and adjusting the curvature of the spreader wings in combination to the curvature of the curved section.

For example, if the curved section is an edge of the blade, the following embodiment is useful. In this case, the two bendable spreader wings are configured for facing each other when the centre region is positioned at the edge of the turbine blade while the two spreader wings are facing the surface of the turbine blade on either side of the edge for abutting the turbine blade when the spreader wings are bent around the blade edge by the bending mechanism.

In this case in practice, the spreader tool is oriented by the arm relatively to the edge, and adjusted to a bent configuration with the two spreader wings on either side of the edge adjusted to the curvature of the turbine blade around the blade edge. In this configuration, the spreader tool is moved along the edge and is dragging the viscous material along the surface, optionally with a flexible band that functions similarly to a squeegee. This way, the viscous material is spread properly on the edge.

The spreader tool has been developed especially for spreading viscous material onto bent surface sections of the blade, for example around edges of the blade, and is capable of bending correspondingly. However, in some embodiments, the wings of the spreader tool are adjustable not only into a bent configuration but can also be straight. This implies that the spreader tool can shift between abutment of the edge of the blade and abutment of the quasi-plane surface at the flat side of the blade.

In some concrete embodiments, the robot has a base that comprises a base attachment device for securing the base stationary to the surface. The base attachment device provides secured stationary contact with the surface when activated. This base attachment device is de-activated when the robot is raised and lowered or when the robot is moved sideways. During working of the surface, the base attachment device is activated to secure the robot stationary in place relatively to the surface.

For the concrete embodiment of the robot with the base and the arm, the method may include the further steps of securing the base stationary at a stationary position on the surface by the base attachment device and providing the remote end of the arm with a tool and inspecting or working the surface with the tool while the base is in contact with the surface and secured stationary to the surface. The dispenser tool and the spreader tool are two examples of such tool.

In order to provide electricity to the robot or for providing fluids, for example water, compressed air, or hydraulic fluids, a line with at least one of an electrical cable and a fluid tube is provided for connection to the robot from a base station. For example, such base station is provided at the base foundation of the operation site, or alternatively on a suitable platform, typically below the level of the robot, although this is not strictly necessary. A further alternative, especially in case of offshore installation, such as offshore wind turbines, the base station is provided on a vessel, for example a ship, or on or at the transition piece.

Optionally, the combination of base and arm of the robot are used for moving the robot along the surface of the operation site. This mechanism is explained in more detail in the following. For this case, the remote end of the at least one arm comprises an arm attachment device for securing the remote end stationary to a surface of an operation site. For being stationary secured, the arm attachment device is in contact with the surface. Similarly, as already mentioned above, the base comprises a base attachment device, which is different from the arm attachment device, for securing the base stationary to the surface.

Examples of attachment devices are a suction cup, a dry adhesive pad, an electromagnetic pad, or an electrostatic pad, Velcro® pads, or sticky or high-friction pads. The term dry adhesive pad is here used for devices that exhibit adhesive behaviour as explained in the introduction above without using a liquid adhesive. Examples are devices that function similarly as gecko feet, for example comprising artificial nanosized structures as disclosed in U.S. Pat. Nos. 7,762,362, 8,882,996, 8,398,909, US2014/272272, US2014/227473. It is pointed out that the base and arm attachment devices need not be of identical type but can be different.

In these embodiments, the system is configured for a sequence of operations comprising,
  adjusting the elevation level of the robot by the length adjustment mechanism;
  then securing the base stationary to the surface by the base attachment device;
  while the base is in contact with the surface and secured stationary to the surface, moving the remote end of the arm to an attachment point on the surface, the attachment point being distant from the secured stationary base, and securing the remote end of the arm to the surface at the attachment point,
  while the remote end of the arm is still secured stationary at the attachment point on the surface, detaching the base attachment device from its stationary position on the surface and moving the base relatively to the attachment point by moving the arm relatively to the base or by changing the elevation level of the base by the length adjustment mechanism or by a combination thereof.

By this movement, the robot is always attached to the surface, either by the base being in contact with the surface and stationary secured to the surface or by the remote end of the arm being in contact with the surface and stationary secured to the surface.

For example, when the remote end of the arm is secured stationary on the surface at an attachment point on the surface, the arm is used to drag the base, typically along the surface, towards the attachment point or to push it away. Alternatively, the remote end of the arm is secured stationary to the surface at the attachment point, and the base is moved by the length adjustment mechanism. A combination of the two functions is also possible, where the remote end of the arm is secured stationary to the surface at the attachment point, and the base is moved by the length adjustment mechanism as well as by movement of the arm. Typically, the dragging or pushing by the arm is used for sideways movements, which optionally are combined with level adjustment by the length adjustment mechanism.

Optionally, the base comprises a magazine with at least one tool, the magazine comprising a magazine coupling and the tool, for example dispenser tool and/or spreader tool, comprises a first tool coupling configured for cooperation with the magazine coupling for securing the tool in the magazine. The remote end of the arm, or a remote end of a further arm, comprises an arm coupling, and the tool comprises a second tool coupling for cooperation with the arm coupling and securing the tool to the remote end of the respective arm. In operation, the remote end of the respective arm is moved to the magazine, and the arm coupling is adjusted to an orientation and position where the arm coupling and the second tool coupling are in a mating orientation. Then, the arm coupling is locked to the tool coupling, and the first tool coupling is released from the magazine coupling for removing the tool from the magazine by the respective arm. Once the tool is secured to the respective arm, the tool can be operated by it.

For example, tools are provided for grinding the surface, optionally a wind turbine blade, a dispenser tool for filling filler into cracks and ground areas, as well as a spreader tool for smoothing the filler in order to obtain a repaired surface. As a further alternative, a screwing tool is provided for tightening bolts that hold blade parts together or that hold blades to the rotor centre of a wind turbine. Such operation of a tool, such as screwing tool, is potentially driven electrically, pneumatically or hydraulically. For example the tool is provided with electrical power from the arm. Alternatively, for hydraulic or pneumatic tools, correspondingly, compressed air or hydraulic fluid is provided through tubing in or along the arm. Typically, as already described above, the electrical power, water, compressed air or hydraulic fluid is provided to the respective arm from a base station.

In some useful embodiments, the base comprises a magazine with a tool or a plurality of tools. For example, the tools are different for various work steps in a sequence of work steps, for example various working steps for inspecting, cleaning, repairing and/or painting sequence. Repair examples also include exchange of lightning receptors, bolt tightening, or gluing various aerodynamic add-ons onto the blade, for example vortex generators.

However, it is also possible to use the magazine with plural identical tools; this embodiment is useful if the tools have a short lifetime for a given process. For example, in case that a large surface has to be cleaned, ground, repaired or painted, a single tool may not be functional for the entire surface, and has to be exchanged to a properly working tool when the capabilities are not sufficient any more after some time of use of the tool. The dispenser with multiple cartridges, one-time-use cartridges, for example of the type as explained above, is useful in such situation, as the only the cartridges need to be changed and not the entire tool.

In some embodiments, especially if the robot comprises only one arm, the attachment device is detachable from the arm. In this case, it is automatically detached and stored in the tool magazine. For this reason, it advantageously comprises couplings identical to the first and second tool coupling. In order to detach the attachment device from the arm, the remote end of the arm is moved to the magazine and the attachment device is transferred to the magazine before the tool from the magazine is coupled to the arm.

Typically, the robot comprises a control unit for electronically controlling the operation of the at least one arm. The electronic control unit activates the necessary actuators, for example electrical actuators by corresponding electrical switches or pneumatic or hydraulic actuators by corresponding valves.

In some embodiments, the control unit comprises a computer that is programmed for autonomously video-inspecting the site and evaluating the video signal and thereupon autonomously running a treatment program with the available tools, optionally after modification and adaptation of the treatment program in dependence on the evaluation. The treatment program potentially involves steps of cleaning, repairing and/or painting. Alternatively or in addition to a video signal, signals of other sensors can be used as well, for example tactile sensors or infrared sensors or laser scanners.

Alternatively, the control unit is connected by a data transfer line to a control station, for example remotely located. For inspection, the robot comprises an inspection tool, and the operation site is inspected by the inspection tool, for example imaged by a video camera, and the inspection signals are transmitted from the inspection tool to the remote control station and at the remote control station evaluated for remote operating the at least one arm. Remarkably, in this advantageous operation model, the robot is transported to an operation site without the expert operator being needed present on site, due to the possibility of remote inspection, evaluation and operation. The latter has the advantage of the control station having the possibility of handling multiple robots at different sites with the need of only relatively few expert operators, as the expert operators do not need to be moved to the various sites with the robot but can stay in the remote control station.

In principle, the data connection line for the data communication between the remote control station and the control unit of the robot can be a wireless data line using satellite transmission or a wireless data network. However, especially for offshore wind turbines, wireless data transmission lines, typically, are not satisfactory for the purpose, why a wired connection is preferred. As offshore wind turbines are equipped with not only offshore-onshore power cables but also data transmission cables on the bottom of the sea, these cables can also be used for transmitting the data between the remote control station and the control unit of the robot for the operation of the robot. Optionally, for this reason, the control unit has a signal cable socket for connection to a signal cable, through which it receives operative control signals from the remote control station. This way, the operation of the at least one arm is controlled by wired data signals.

For example, the remote end of the arm is moved to the magazine, if present, and then coupled to the tool, and the tool is released from the magazine. Once, the tool is on the arm, it can be operated by the at least one arm while the base is secured to the blade surface.

Optionally, a tool kit is provided for a robot system as described above, the tool kit comprising a grinding tool for grinding a surface, a dispenser tool for dispensing filling material to the surface, and a spreader tool for shaping the filling material on the surface.

Although the use of the robot system is exemplified herein with reference to a wind turbine, in particular for servicing outer components of wind turbines, the invention is of more general character, and the robot system is advantageously used for cleaning, painting or repairing a surface, optionally vertical surface or inclined surface, for example a wall of a building.

It is pointed out that the arm can have further functions. For example, the arm can be used to lift devices from a remote location to the vicinity of the base. In addition, the arm can be used to assist another similar robot to move to the operation site, for example by lifting the other robot up from the ground, while the base is secured to the surface.

In the following, a system is described that comprises an unmanned robot and at least one wire, for example two or three wires, to which the robot is attached, and wherein the at least one wire is dimensioned for carrying the weight of the robot by the at least one wire. If only one wire is used, it is dimensioned to carry the entire weight of the robot. If more than one wire is used, for example two or three wires, it is sufficient that the wires are dimensioned to hold the weight in common. Typically, however, for safety reasons, even in the case of multiple wires, each wire would be dimensioned to hold the entire weight.

When this exemplified system is in in operation, the at least one wire is attached to an anchor location and extends downwards, as the anchor location is at a level above the robot.

In some embodiments, the at least one wire is not necessarily carrying the robot at all times but used as a safety line in order to prevent accidents, for example if the robot is of the type that is holding itself to the surface and accidentally should slide off or down the surface. Examples include attachment of robots by vacuum suction to the surface or by a multi-arm grabbing mechanism.

In other embodiment, the at least one wire is used for carrying the robot and the adjusting the elevation of the robot by lifting or lowering the robot on the wire. In such embodiment, a length adjustment mechanism is provided for adjusting the length of the at least one wire between the robot and the anchor location. This length adjustment can be used for thereby raising or lowering the robot or for length adjustment of the wire when the robot is moved sideways and thereby changes the distance from the base to the anchoring location. Thus, the at least one wire can also be sued as a support when moving the robot sideways without necessarily raising or lowering the robot. Advantageously, the base is configured for attachment to the at least one wire in order to change the elevation level of the base, and the at least one wire secures the robot against gravity at desired heights.

In some embodiment, for the length adjustment mechanism, the base is provided with a dragging unit by which the base is dragged along the wire, for example selectively in an upwards or downwards direction. An example of a dragging unit with rollers between which the wire kept under pressure is disclosed in Korean patent application KR20140000383 by Samsung Heavy Ind.

As an alternative, the at least one wire is rolled onto at least one roller which is part of the base. In this case, typically, the at least one wire does not hang further down than the robot. As a further alternative, the robot is secured to the at least one wire, for example to the end of the at least one wire, and the length adjustment mechanism comprises a wire hoist at elevated level above the robot, for example at the top of a wind turbine, which is used to lift the robot up and down as desired by winding up or rolling out the wire or wires.

In some practical procedures for operating the system, the following steps are used. The at least one wire is attached to the anchor location, and the robot attached thereto below the anchor location. The elevation level of the robot is adjusted by adjusting the length of the wire by the length adjustment mechanism and locating the robot at the surface of the blade, for example near the edge of the blade.

In this operational model, the at least one wire is attached at an elevated level at the operation site, for example at an anchor location on the nacelle or the rotor of a wind turbine. The robot is attached to the wire or wires for moving it up to an elevated level. In order to operate the robot from the remote control station, a data connection line is established between the control unit of the robot and a remote control station, and operation signals are transmitted from the remote control station to the control unit. This way, the arm can be remotely operated by operation signals from the remote control station without the need of operation experts on site. This is important because transport to and from the operation site requires relatively long time, and due to the remote operation, the experts can operate optimally.

As already pointed out, although the robot can be used in various operation sites, in principle, one particularly interesting operational example is where the operation site is a wind turbine with a wind turbine blade. The wire is attached to an anchoring location on the nacelle or on the central part of the rotor, and the wire extends downwards therefrom. The base is moved along the wire by remote control of the dragging unit from the control station or by lifting the base with a remotely controlled hoist, thereby increasing the elevation of the robot until the robot is abutting the wind turbine blade. By the base attachment device, the base is secured to the blade surface. While the base is secured to the blade surface and maintained stationary on the blade surface, the arm is extended, typically extended sideways, from the base, and the remote end of the arm is secured by the arm attachment device, for example arm suction cup or the arm dry adhesive pad, for remaining stationary secured to the blade surface at the attachment point. The base attachment device is released from the blade surface and moved relatively to the attachment point of the remote end of the arm by moving the arm relatively to the base or by changing the elevation level of the base by the length adjustment mechanism or by a combination thereof. For example, the base is dragged along the blade surface relatively to the attachment point, or pushed away therefrom. After moving the base relatively to the remote end of the arm, the base is again secured to the blade surface by activating the base attachment device. While the base is stationary relatively to the blade surface, the arm attachment device at the remote end of the arm is than again released from the blade surface for the next action.

SHORT DESCRIPTION OF THE DRAWINGS

The invention will be explained in more detail with reference to the drawing, where FIG. 1 is a sketch of an embodiment of the invention on a wind turbine with a base station on the ground;

FIG. 2 a-c illustrate a) mounting of the wire, b) mounting of the robot to the wire, lifting of the robot along the wire;

Figure 6:
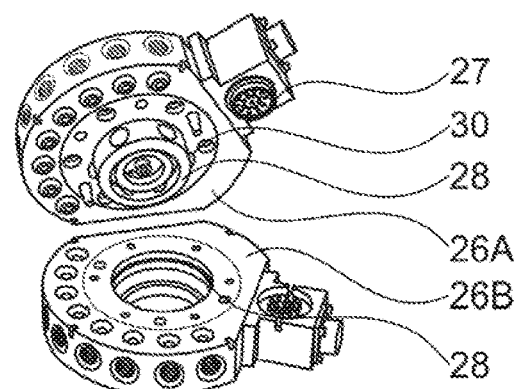
Figure 7:
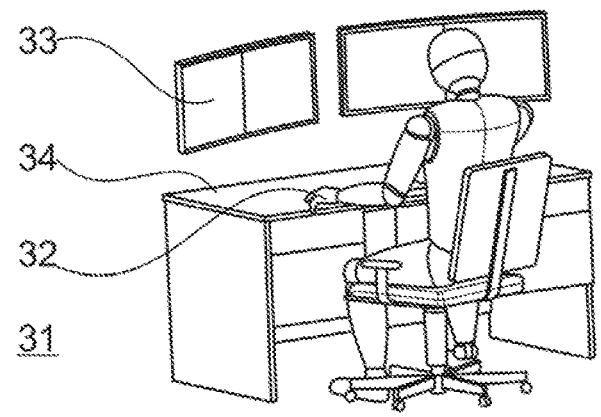
Figure 8:
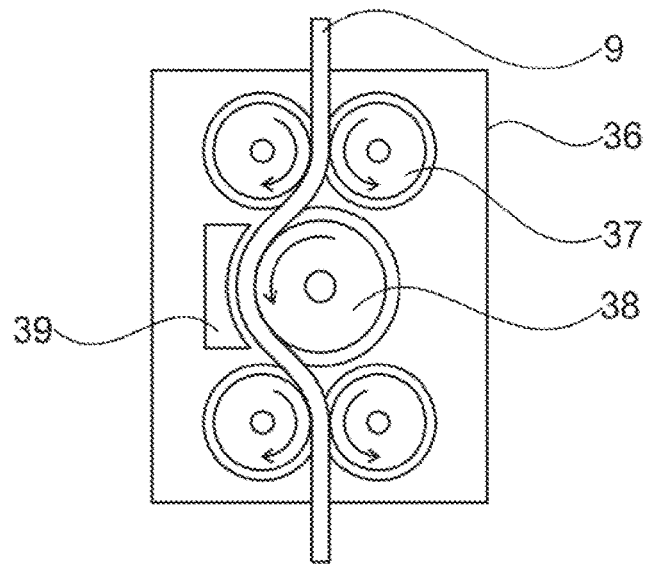

FIG. 5 a-b illustrates a robot a) without and b) with an attachment device on the arm;

FIG. 6 is an example of couplings for coupling tools to the base;

FIG. 7 illustrates a remote control station;

FIG. 8 illustrates a dragging unit;

FIG. 9 illustrates a dispenser tool in a) an overview drawing and b) with details;

FIG. 10 illustrates a revolver-type dispenser tool in a) perspective view, b) cross sectional side view, and c) from view;

FIG. 11 shows a spreader tool a) on a wing, b) in enlarged view, and c) from the opposite side;

FIG. 12 shows the spreader tool in straight configuration a) in a view towards the flexible band and b) in a view towards the actuators.

DETAILED DESCRIPTION/PREFERRED EMBODIMENT

Figure 1:
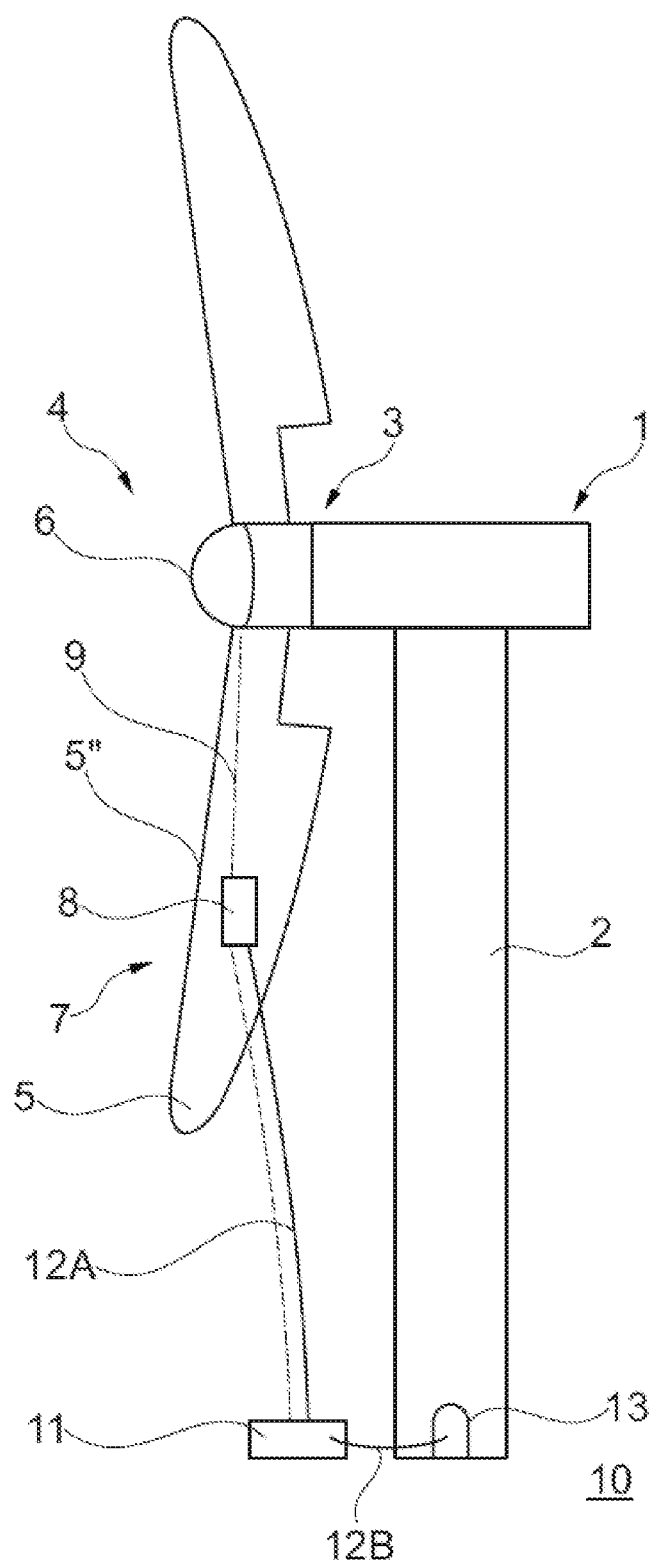

FIG. 1 is an illustrative embodiment of the invention. A wind turbine 1 comprises a tower 2 and a nacelle 3 onto which a rotor 4 is rotationally coupled. The rotor 4 comprises a plurality of rotor blades 5 secured to a centre 6 of the rotor 4. A system 7 comprises a robot 8 and a wire 9 to which the robot 8 is attached. The wire 9 is secured to the rotor 4, for example the centre 6 of the rotor 4, and/or to the nacelle 3 and extends downwards towards the base region 10 of the wind turbine 1.

On the base region 10 of the wind turbine 1, a base station 11 is provided for assisting the operation of the robot 8. For example, the base station 11 provides electricity in case that the robot 8 is not provided with a battery system. In addition or alternatively, it provides at least one of the following: water, cleaning liquid, compressed air for cleaning and/or for pneumatic driving of tools, hydraulic fluid, and/or paint for painting. For this reason, the base station 11 is connected to the robot 8 by a line 12A comprising at least one cable and/or at least one flexible tube for a fluid. Optionally, the line 12A is a hose, also called an umbilical, inside which there is provided a plurality of fluid tubes or at least one cable and at least one fluid tube.

For example, the line 12A comprises a first cable, and the base station 11 is wired by this first cable to the robot 8 and by a second cable 12B through a port 13 in the tower 2 in order to receive electrical power and/or to communicate with a remote control station through a wired data transfer cable connection. The latter is particularly advantageous in case where the wind turbine 1 is an offshore installation where no sufficient wireless data connection is available.

Figure 3:
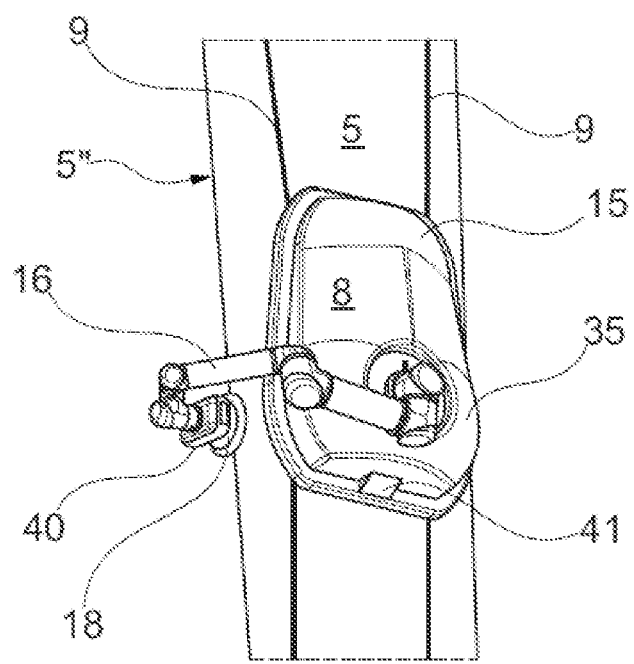
FIG. 3 illustrates the robot with a grinding tool on the leading edge of the blade.

Optionally, the base station 11 comprises a transceiver, wired or wireless, for data communication with the robot 8. In case of wireless communication, the robot 8 comprises a corresponding wireless data transceiver 41, as illustrated in FIG. 3

As an alternative, the base station 11 is not provided at the base region 10 of the tower 2 but on a platform 19 of the tower 2, where the platform 19 is provided at a higher level than the base region 10 of the tower 2. As a further option, the base station 11 is provided on a vessel in case of offshore installations, such as offshore wind turbines.

Figure 2A:
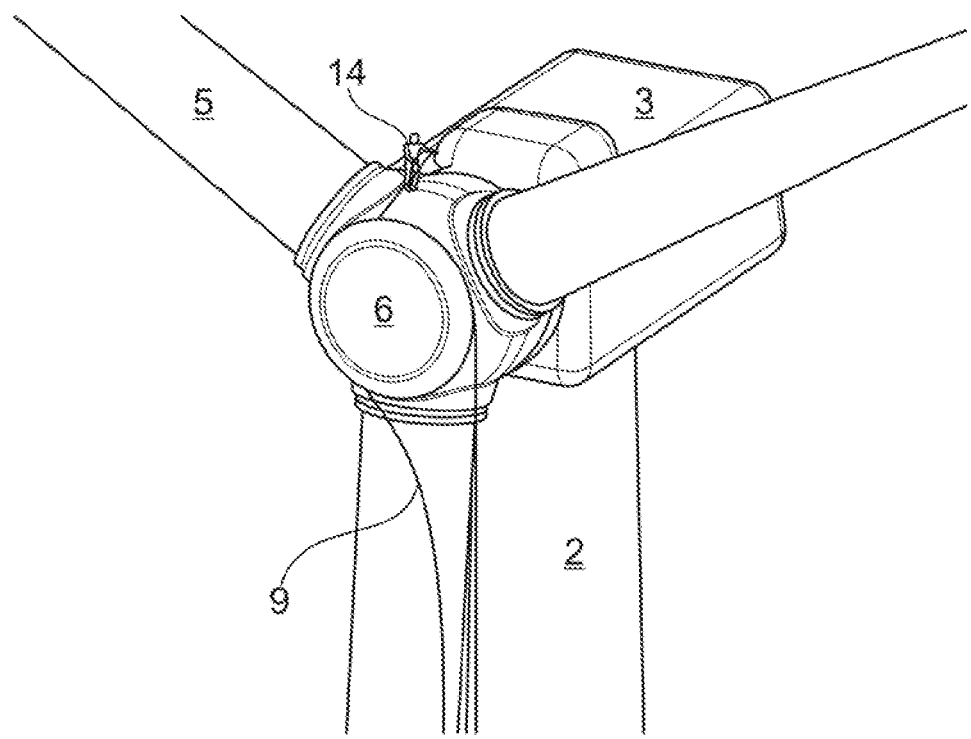
Figure 2B:
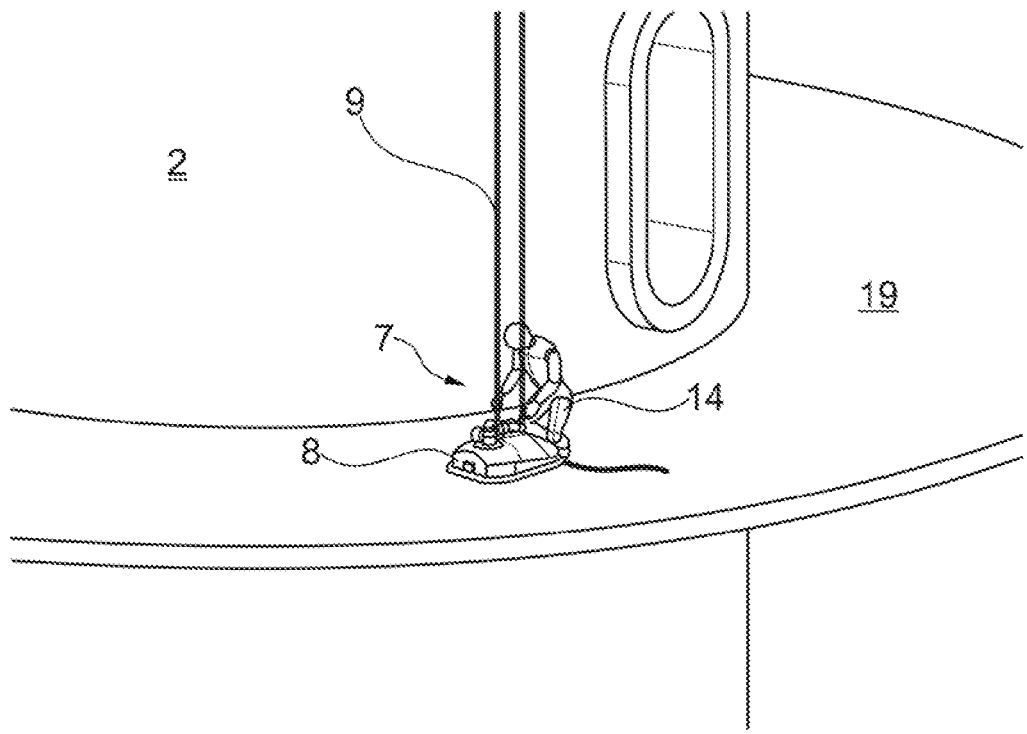

An example of a method for installation is illustrated in FIG. 2a. A person or a team of persons, in the following for simplicity called the installer 14, installs the two wires 9 at the turbine top and lets the wires 9 hang down while one of the blades 5 is oriented vertically downwards. As illustrates in FIG. 2b, the installer 14 mounts the robot 8 onto the wires 9. It is pointed out that in this illustrated example, that the robot 8 is mounted onto the wires on a platform 19, however, it can also be mounted to the wire at the base 10 of the wind turbine.

Figure 2C:
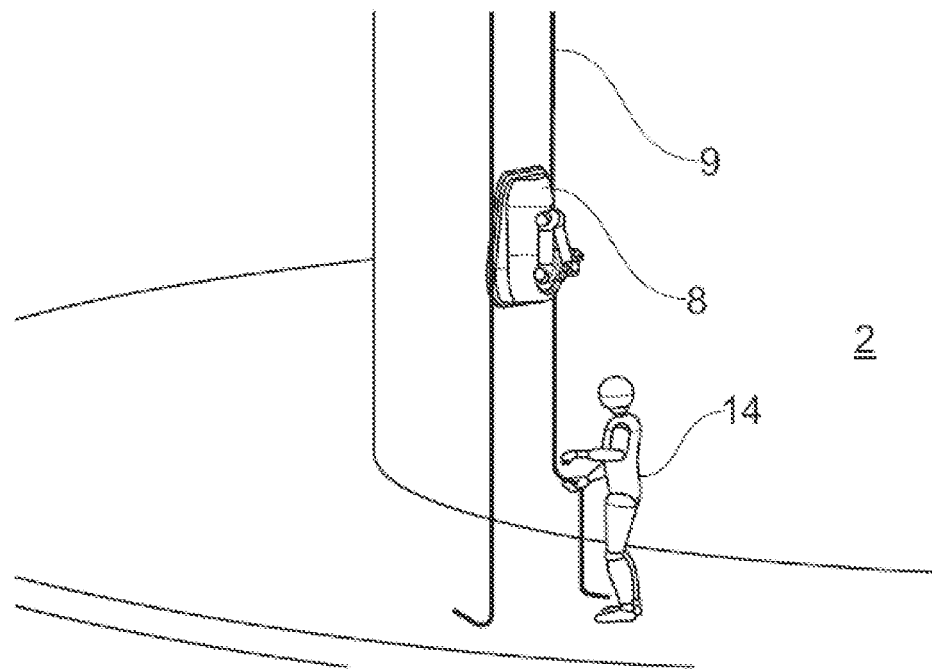

For example, the robot 8 is provided with dragging units through which the wires 9 extend and in which they are held in place. The dragging units are configured for running along the wires 4 and thereby drag the robot 8 along the wires 9 in an upwards or downwards direction as illustrated in FIG. 2c. Thereby, the dragging unit provide a length adjustment mechanism for adjusting the length of the at least one wire 9 between the robot 8 and the anchor location for thereby lifting or lowering the robot 8. An example of a dragging unit is illustrated in FIG. 8.

FIG. 3 illustrates a robot 8 in operation. The robot 8 comprises a base 15 from which an arm 16 extends. The arm 16 comprises seven rotational couplings 17a-g as illustrated best in FIG. 5a, giving the arm seven degrees of freedom for motion relatively to the base 15. The illustrated number of actuators is exemplary and could be different from seven. The base 15 is secured to the blade 5 while the arm 16 is provided with a grinding tool 18 for grinding the leading edge 5" of the blade 5. Such grinding is used prior to filling possible damages with adequate filler as part of the repair of the blade surface 5'. In addition, the arm 16 comprises a video camera 40 for inspecting the site and for controlling the actions.

Figure 4:
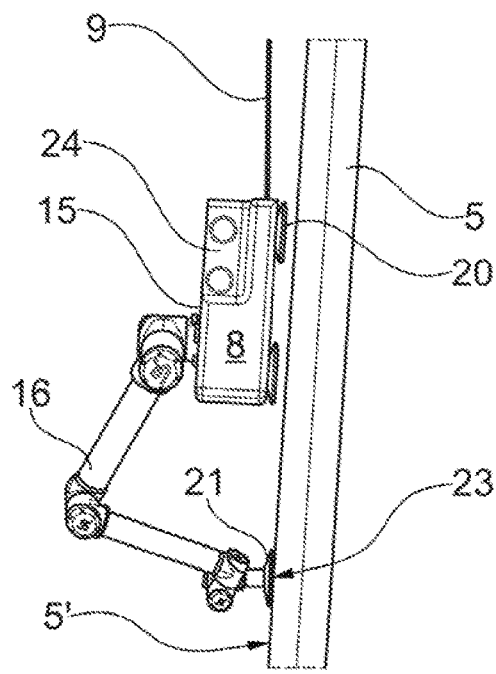
FIG. 4 illustrates an embodiment of the robot in greater detail with an attachment device on the blade.

As an alternative to the illustrated embodiment, the wires 9 are rolled onto rollers (not shown) which are part of the base 15 and located inside the base 15. In this case, the wires 9 do not hang further down than the robot 8. Such exemplary embodiment with rollers that roll up the wires is also illustrated in FIG. 4. As a further alternative, the robot 8 is secured to the wires, for example to the end of the wires, and a hoist is provided at the top of the wind turbine which is used to lift the robot up and down. Such exemplary embodiments are similar in appearance as the embodiments that are illustrated in FIG. 4 as the rollers are provided inside the base.

As illustrated on FIG. 4, a base attachment device 20 is provided, for example a plurality of base suction cups, as part of the base 15 for securing the base 15 to the blade 5 surface 5'. The base suction cups are exemplary and the base attachment device 20 could be provided by other means as mentioned in the description above.

In this particular illustration, the arm 16 is provided with an arm attachment device 21, for example an arm suction cup, for securing the remote end 22 of the arm 16 to an attachment point 23 on the blade surface 5'. The arm suction cup is exemplary and the arm attachment device 20 could be provided by other means as mentioned in the description above.

When the base attachment device 20 is released from the blade surface 5', the arm 16 can drag the base 15 towards the attachment point 23. For sake of illustration on FIG. 4, the arm 16 is directed partly downwards and partly to the side such that a drag would be skew downwards. Such movement of the arm would typically be assisted in change of the length of the wire by the length adjustment mechanism. In many situations, however, the arm 15 would be placed more sideways relatively to the base 16 such that the vertical adjustment of the position against gravity is determined by interaction with the wire 9, whereas the sideways movement is determined by drag from the arm 16 on the base 15.

Figure 5A:
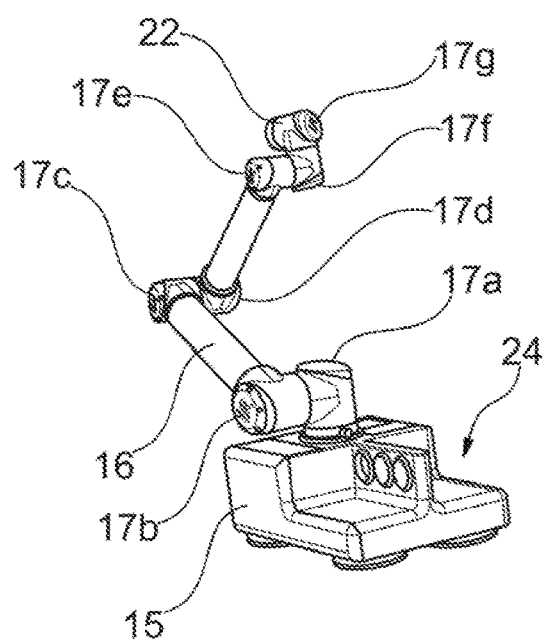
Figure 5B:
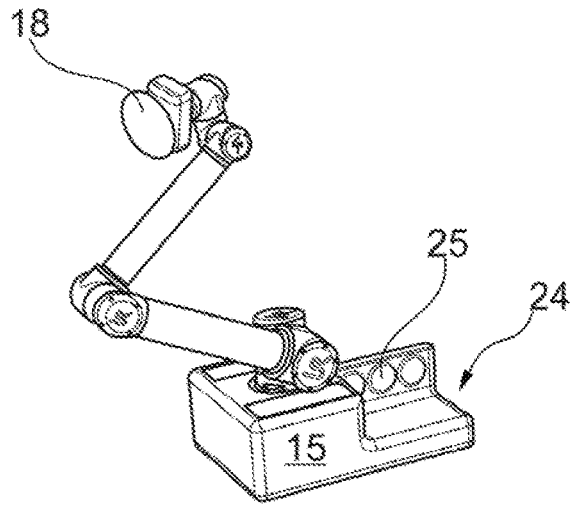

FIGS. 5a and 5b illustrate the robot 8 in further detail, where FIG. 5a illustrated the arm 16 without tool and FIG. 5b illustrates an arm attachment device 21 coupled to the remote end 22. The base 15 comprises a magazine 24 for a plurality of tools, for example in particular for working a surface. The magazine 24 comprises a plurality of magazine couplings 25 for coupling of tools to the magazine couplings 25, in the present illustration three magazine couplings, although the number can be different depending on the requirements.

An example of a coupling with two coupling counterparts 26A, 26B is illustrated in FIG. 6. The coupling counterparts 26A, 26B are operated electrically through a connector 27 such that after mating, electrical power activates a locking mechanism 28, in this case a recess 29 into which an expandable ring of balls 30 is secured.

As illustrated in FIG. 1, optionally, the base station 11 is wired for data transfer through a data transfer cable 12B. Such cable is useful for offshore wind turbines 1 as wireless data networks are typically inadequate offshore. However, wind turbines 1 are typically connected by electrical cables for transport of electrical power as well as connected by data transfer cables to onshore stations. Such data cables are advantageously extended for transferring data between the robot and an onshore control station as illustrated in FIG. 7. In the remote control station 31, an operator 32 is remotely operating the offshore located robot 8, for example by watching display screens 33 and operating a control panel 34. The operation of the control panel 34 causes transmission of operational command data to the control unit 35 of the offshore-located robot 8, the control unit 35 illustrated in FIG. 3. With reference to FIG. 7, the display screens 33 can be used to watch the video sequence recorded by a video camera on the arm or the base.

As a further option, the robot 8 can be operated using virtual reality tools, similar to those used for corresponding computer games. For example, the operator 32 is provided with special an operational unit, the movement of which by the operator's arm causes the arm 16 to move correspondingly.

FIG. 8 illustrates an example of a dragging unit 36 for the base 8. The wire 9 runs through pairs of rollers 37 which squeeze the wire 9 in between them such that rolling of the pairs of rollers 37 drags the dragging unit 36 along the wire 9, even in lifting action against gravity. The wire 9 also move around a brake roller 28, which in squeezing cooperation with a brake shoe 39 secures the wire at a predetermined position. This way, the robot 8 is secured against falling. Alternatively, the robot 8 comprises rollers for winding up the wires inside or on the base.

Figure 9A:
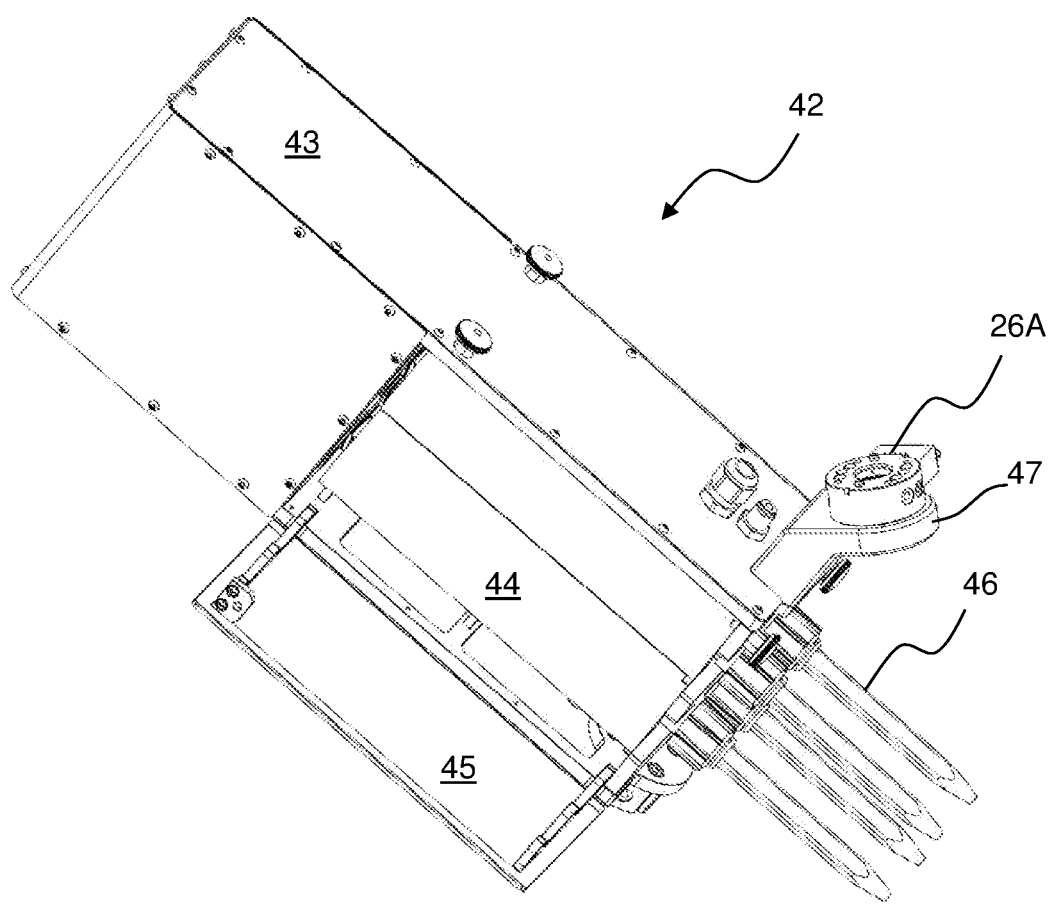

FIG. 9a shows a dispenser tool 42. Inside a housing 43, dispenser cartridges 44 are provided from which material, for example filler material or glue, is provided through corresponding nozzles 46. An access door 45 gives access to the cartridges 44 for exchange thereof. On a bracket 47, a coupling counterpart 26A is provided for receiving electricity for driving the tool and/or fluids as part of a pneumatic or hydraulic driving system for the dispensing action.

Figure 9B:
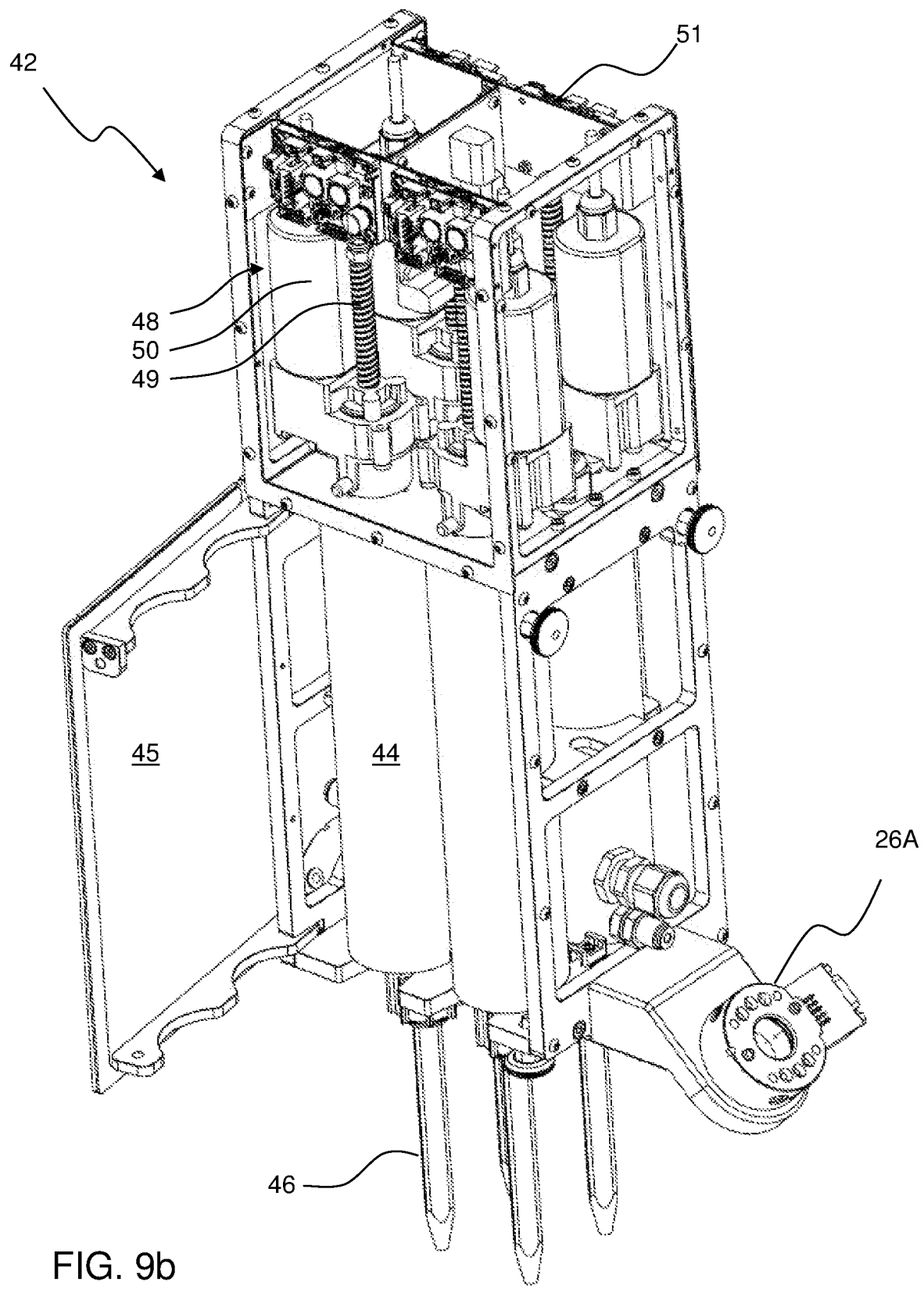

FIG. 9b is a detailed drawing of an example of such dispenser tool 42 where part of the housing 43 has been removed. The dispensers cartridges 44 or of the type with a nozzle 46 is screwed onto the cartridge 44, and the cartridge 44 comprises an end cap that is sliding inside the cartridge 44 wall such that pressing of the sliding end cap towards the nozzle 46 causes expelling of the content of the cartridge 44 out of the nozzle 46. This type of cartridge 44 is standard for glues and filler materials and optionally for one-time-use. The end cap (nor shown) is driven by a dispenser actuator 48 in which a spindle 49 is driven by an electrical motor 50 against the end cap inside the cartridge 44 housing 43. As illustrated, four dispenser actuators 48 with corresponding motors 50 and spindles 49 are provided for the four cartridges 44, however, the number can be different. Electricity for the motors 50 is provided through the coupling 26A.

Proper control of the actuators 48 is achieved with the electronic boards 51 connected thereto.

Typically, only one of the dispensers 44 is used at a time. In order to properly control the dispensing from the corresponding nozzle 46 to the surface 5', the arm that is holding the dispenser tool 42 through the coupling 26A is angled into a fitting orientation where only the predetermined dispenser nozzle 46 is in contact with the surface 5' or so close to the surface 5' that the dispensed viscous material is dispensed onto the surface 5'.

FIGS. 10a, 10b, and 10c illustrate an alternative embodiment, in which the cartridges 44 are provided in a rotational drum magazine 66 of a revolver type dispenser tool 42, where the rotational drum 66 is rotated by a motor 67 until one of the cartridges 44 is aligned with a dispenser actuator 48, for example similar to the type as illustrated in FIG. 9b with a spindle 49 and a motor 50 that drives the spindle 49 which in turn pushes the end cap 68 towards the nozzle 46. Due to the rotation with the drum 66, the nozzle 46 of the cartridge 44 that is aligned with the dispenser actuator 48 always has the same position. For this reason, the orientation of the dispenser tool 42 relatively to the blade surface 5" is the same independent of the cartridge 44 which is to be used for dispensing.

Once, the material from the cartridge 44, such as glue or filler material, has been dispensed from the cartridge 44 through the respective nozzle 46 onto the surface 5', a further tool is provided for properly spreading the dispensed viscous material on the surface 5'.

In some cases, the edge 5" or another curved section of the surface 5' of the blade 5 is repaired by dispensing a viscous filler material on the surface 5' and subsequently spreading it properly by a spreader tool. An example of such spreader tool is illustrated in FIG. 11.

Figure 11A:
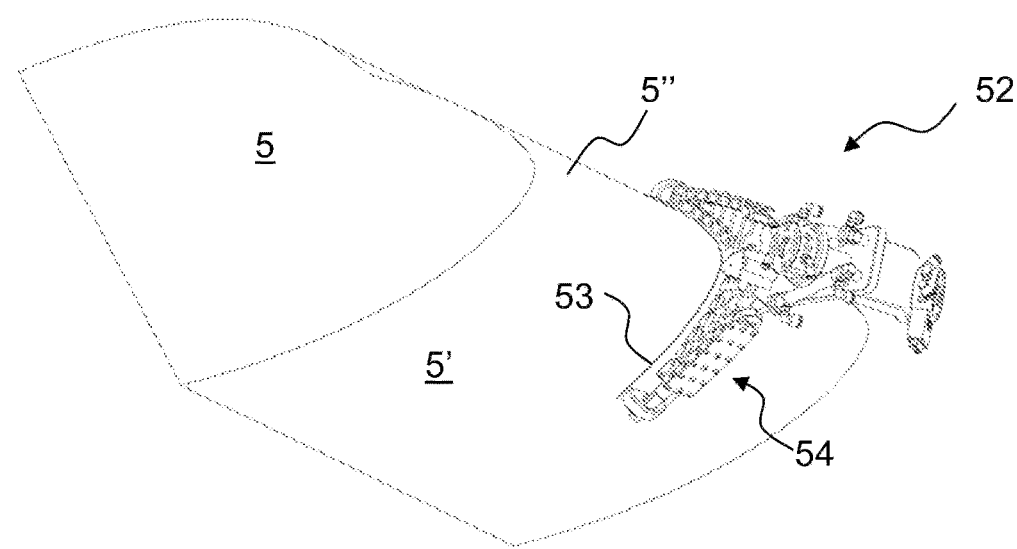

FIG. 11A shows a spreader tool 52 in operation. It has a flexible band 53 fastened to a bendable constructions 54 in order for the flexible band 53 to be used as a squeegee when abutting the surface 5'. When the spreader tool 52 is abutting the edge 5" of the blade 5, the flexible band 53 is deformed into the shape of the blade 5 around the edge 5" and abuts the surface 5' tightly, which is illustrated in the enlarged drawing of FIG. 11b. Hydraulic or pneumatic spreader actuators 58 are used for a controlled deformation of the bendable construction 54. The spreader actuators 58 are provided with corresponding hydraulic or pneumatic tube connectors 65. Correspondingly, the flexible band 53 is deformed when spreading viscous material on other curved sections of the blade surface 5'.

Figure 12A:
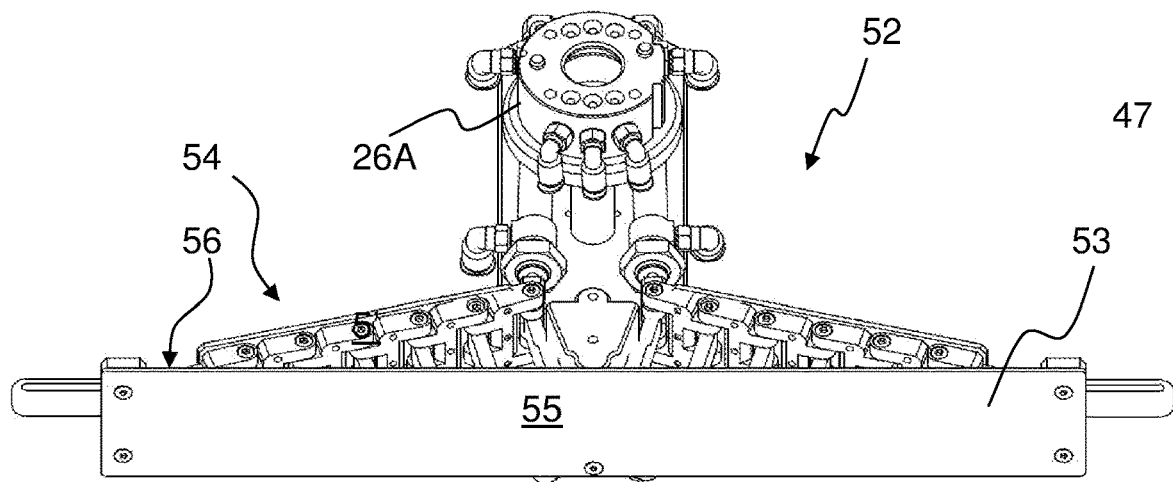
Figure 12B:
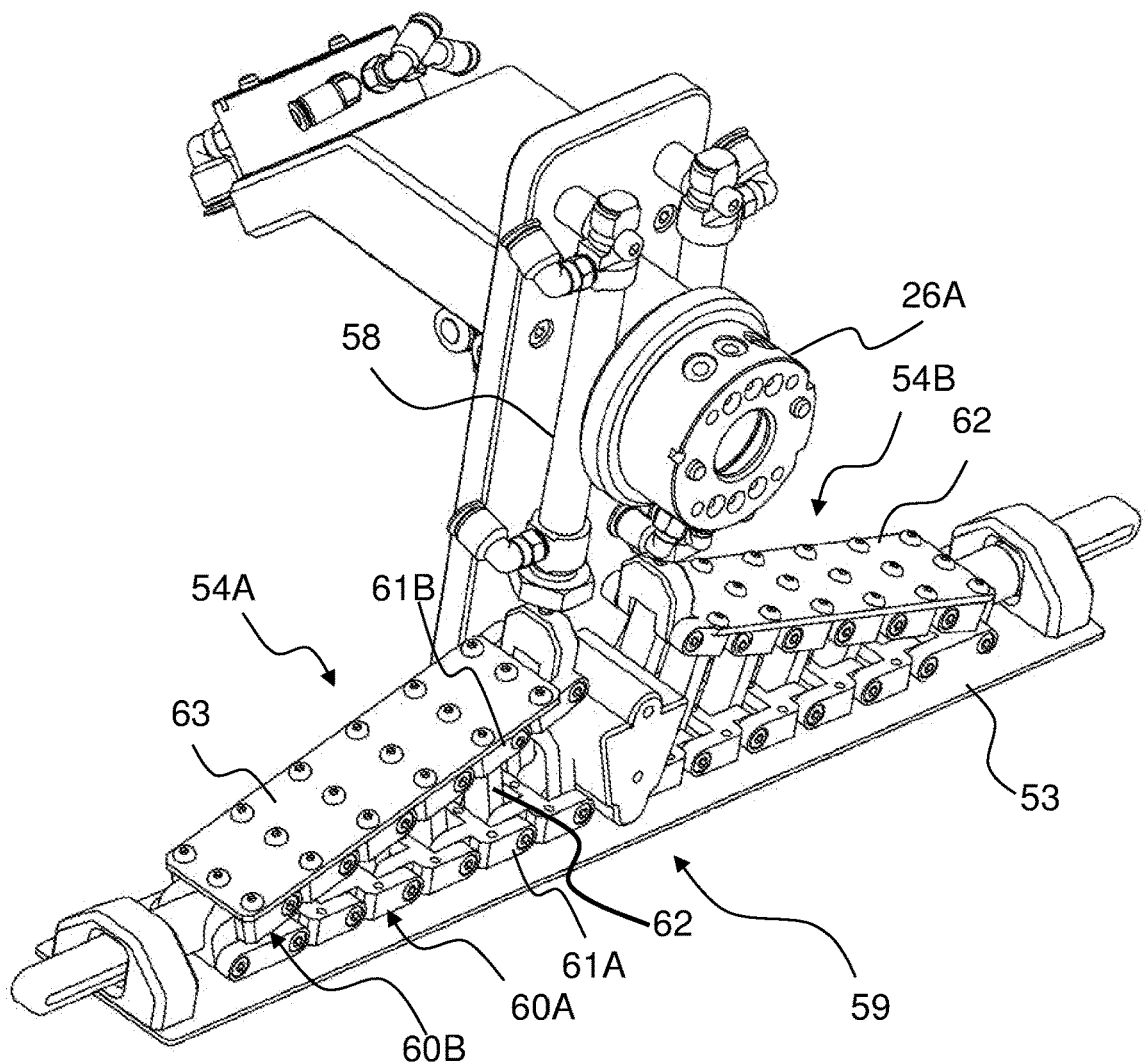

FIG. 12a and FIG. 12b illustrate the spreader tool 52 when its flexible band 53 is in straight condition, for example during storage or when used for spreading viscous material on straight sections of the surface 5' of the blade 5. The flexible band 53 has a flat side 55 directed away from the bendable construction 54 and is configured for contact with the blade surface 5' and a blade edge 56 which is used for spreading the viscous material, for example filler, onto the surface.

Figure 11B:
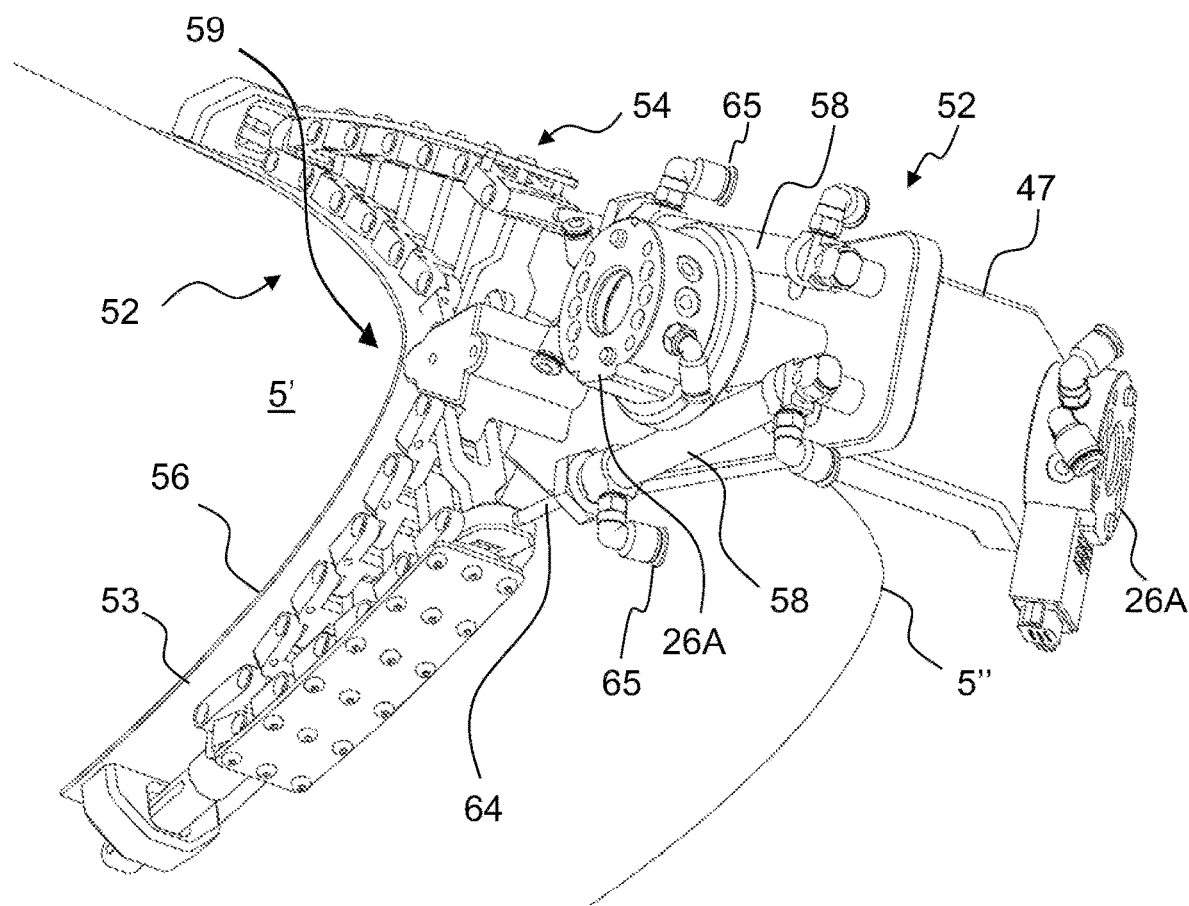
Figure 11C:
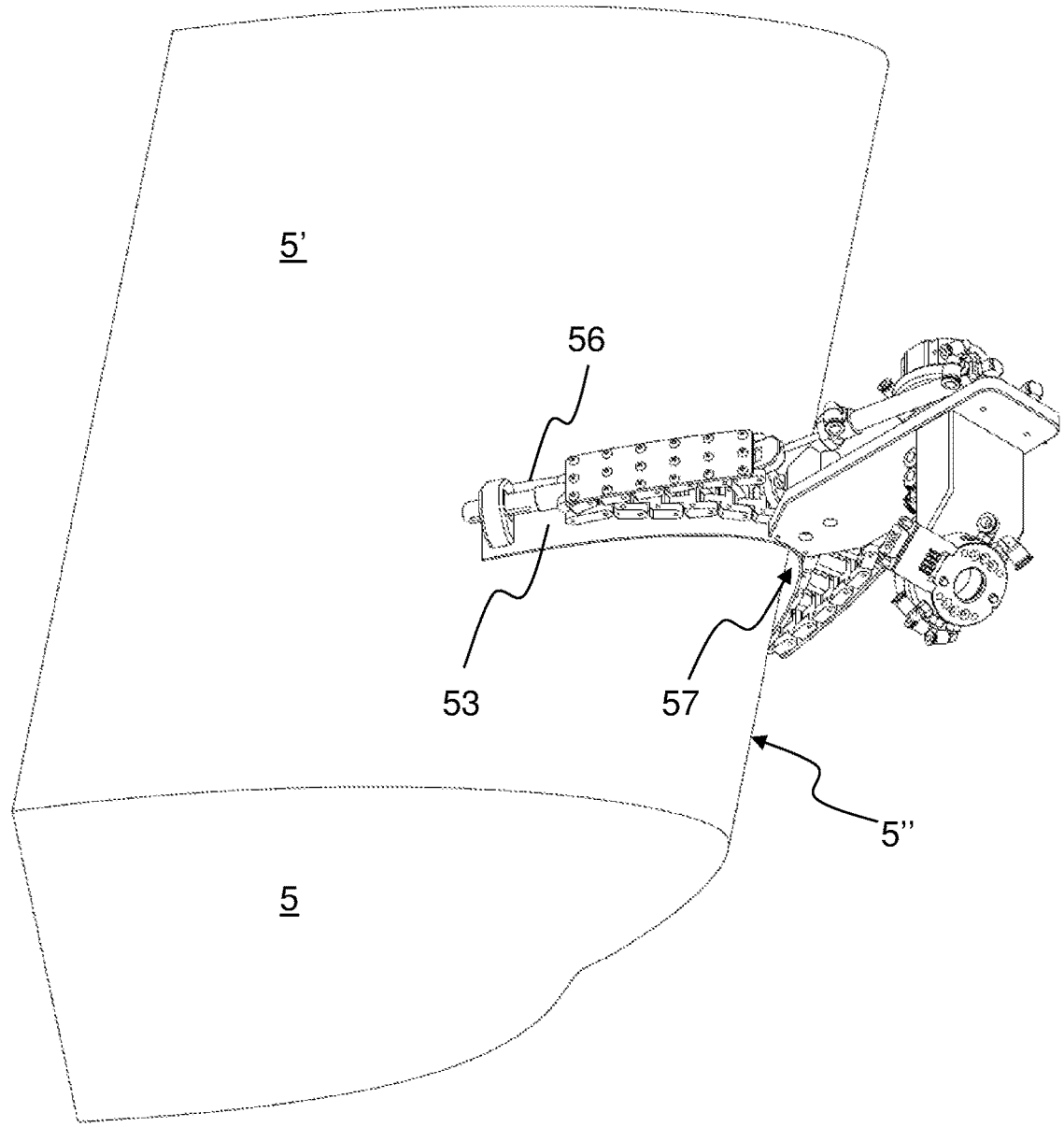

When the spreader tool 52 is held inclined relatively to the surface 5', such that the flexible band 53 is not resting with its flat side 55 against the blade surface 5' but only with the blade edge 56 of the flexible band 53, the viscous material can be evenly spread by the spreader tool 52 over and along the edge 5" surface 5' when the spreader tool 52 is drawn along the edge 5". This situation is illustrated in FIG. 11c, where it is readily recognised that there is a gap 57 between the surface 5' and flat side 55 of the flexible band 53, while the band's blade edge 56 is close to abutting the surface 5' in order to drag the viscous material from inside the gap 57 along the edge 5" while spreading it around the edge 5".

The spreader tool 52 comprises two couplings 26A which gives two possibilities for attachment to the arm of the robot 8. Alternatively, one is used for attachment of the spreader tool 52 to the arm of the robot 8 and another coupling 26A is used when the spreader tool 52 is stored in the toolbox, as it was explained in relation to FIG. 4. As a further alternative, the spreader tool 52 comprises only one coupling 26A.

For example, the coupling 26A is connected to the connectors 65 of the pair of hydraulic or pneumatic actuators 58. In this case, the provision of hydraulic or pneumatic fluid is provided through the robot arm.

When activated, the pair of actuators 58 bend the two sections 54A, 54B of the bendable construction 54, together with the flexible band 53, for example around the edge 5", as illustrated.

As best illustrated in FIG. 12, the bendable construction 54 comprises two spreader wings 54A, 54B which are arranged on either side of a centre region 59, where the centre region in operation is positioned on the edge 5" of the blade surface 5', and the two spreader wings 54A, 54B extend in opposite directions and are bent into the profile of the blade's 5 edge 5" onto opposite sides of the edge 5".

The construction follows a fin-ray principle in which two flexible struts are inclined to each other and a plurality of support beams connect the struts at various locations along their lengths. When one strut is moved relatively to the other, the construction deforms into a curved structure.

In the exemplified embodiment of FIGS. 11 and 11, each spreader wing 54A, 54B comprises a double-chain structure 60 with two chains 60A, 60B as struts. Each chain can only bend in one plane, which is in a direction normal to the flat side 55 of the flexible band 53. When the two chains 60A, 60B are straightened, as illustrated in FIG. 12b, the two chains 60A and 60B are inclined relatively to each other and form an acute angle, typically in the range of between 15 and 45 degrees. A centre region 59 forms the base of a triangle with the two struts, formed by the chains 60A and 60B.

In more detail, a plurality of chain links 61A of one of the two chains 60A is connected to a corresponding plurality of chain links 61B of the other chain 60B by a corresponding plurality of support beams 62 which extends largely laterally from the chains 60A, 60B and which are individually rotationally coupled with their two ends to either of the two chain links 61A, 61B which they individually connect. Due to the two chains 60A, 60B being inclined to each other when straight, the support beams 62 have different sizes and are increasing in length along the double chain 60. The consequence of the triangular arrangement of the two chains 60A, 60B is a bending in a lateral direction, where the bending is not free but which is restricted to a smooth curve by the cooperation of the two chains 60A, 60B, which are linked to each other by the plurality of support beams 62. Whereas one chain 60A is attached to the flexible band 53, the two sections of the other chain 60B are covered by two covering bands 63.

The actuators 58 comprise an actuator rod 64 which is fastened to an end of the outer chain 61B. When the actuators 58 are extended, the actuator rod 64 pushes the outer chain away 61B from the actuator 58 and forces the two spreader wings 54A, 54B to bent around the centre region 59 as illustrated in FIG. 11b.

When the actuator 58 is retracted, the spreader wings 54A, 54B are extended into a straight configuration. Although, the spreader tool 52 has been developed especially for spreading viscous material around edges 5" and is capable of bending correspondingly, the spreader wings 54A, 54B can also be used in straight configuration when filler, glue, or other viscous material is to be spread on the flat surface 5' of the blade 5. For versatility, it is a great advantage that the spreader tool 52 can easily and quickly shift between abutment of the edge of the blade 5 and abutment of the quasi-plane surface 5' at the flat side of the blade 5.

Although, two wings have been used for an exemplification that is suitable for the edge of the blade 5, a spreader tool 52 with only a single spreader wing 54A is also an option, especially, when surface sections with less curvature are repaired. Although, the robot 8 and the specific tools have been explained in detail in relation to a wind turbine 1 and its blade 5 because of the special advantages at such type of operation site, the principles apply equally well when the robot 8 is used at other types of operation sites, for example other types of vertical or inclined walls, for example of buildings.

REFERENCE NUMBERS 1 wind turbine
2 tower
3 nacelle
4 rotor
5 blades
5' blade surface
5" blade leading edge
6 centre of rotor 4
7 system
8 robot
9 wire
10 base region of the wind turbine 1
11 base station
12A first cable between base station 11 and robot 8
12B second cable between base station and first cable to a remote control station 31
13 port in the tower 2 for the second cable 12B
14 installer
15 base
16 arm
17 a-g rotational actuators on arm 16
18 grinding tool
19 platform
20 base attachment device
21 arm attachment device
22 remote end of the arm 16
23 attachment point on the blade surface 5'
24 magazine for tool
25 magazine coupling
26A, 26B coupling counterparts
27 electrical connector of coupling counterparts 26A, 26B
28 locking mechanism of coupling counterparts 26A, 26B
29 recess of coupling counterparts 26A, 26B
30 expandable ring of balls of coupling counterparts 26A, 26B
31 remote control station
32 operator
33 display screens
34 control panel
35 control unit of robot 8
36 dragging unit
37 pairs of rollers
38 brake roller
39 brake shoe interacting with brake roller
40 video camera
41 wireless transceiver in base 15
42 dispenser tool
43 housing of dispenser tool 42
44 cartridge
45 access door to cartridge 44
46 nozzle
47 bracket
48 actuator for dispensing from cartridge 44
49 spindle of actuator 48
50 electrical motor of actuator 48
51 electronic boards 51
52 spreader tool
53 flexible band
54 bendable construction
54A, 54B two opposite spreader wings of the bendable construction 54
55 flat side of flexible band 53
56 edge of flexible band 53
57 gap between one edge of the flexible band while the opposite blade edge 56 is close to or abutting the surface 5'
58 hydraulic or pneumatic spreader actuator
59 centre region
60A first chain carrying the flexible band 53
60B second chain, inclined relatively to first chain 60A when straight
61A chain link of first chain 60A
61B chain link of second chain 60B
62 support beams that connect chain link 61A with chain link 61B at rotational connections
63 covering band for chain sections of second chain 60B
64 actuator rod
65 hydraulic or pneumatic connectors for spreader actuator 58
66 drum of revolver type dispenser tool 42
67 motor for rotation of drum 66
68 end cap of cartridge 44

The invention claimed is:

1. A method of operating a system at a wind turbine including a wind turbine blade with a surface, the method including the following steps:

providing an unmanned robot including a base and an arm extending from the base, the arm having a remote end configured for movement of the remote end relative to the base;

providing a dispenser tool attached to the remote end of the arm and configured for dispensing viscous material on the surface, and wherein the dispenser tool is configured and arranged to hold multiple cartridges containing viscous material, each cartridge having a respective nozzle;

locating the robot at the surface;

selecting at least one of the multiple cartridges in the dispenser tool for dispensing viscous material from the selected cartridge;

via the arm, bringing the nozzle of the selected cartridge into the vicinity of the surface and orienting the dispenser tool relative to the surface such that the nozzle of the corresponding selected cartridge is at the surface; and activating the dispenser tool and providing viscous material onto the surface only from the selected cartridge.

2. The method according to claim 1, wherein the dispenser tool includes a cartridge housing in which the multiple cartridges are arranged with the respective nozzles side-by-side; and the method further includes
at least one active dispensing orientation of the dispenser tool relative to the surface for any selected cartridge;
positioning, in the active dispensing orientation, the nozzle of the selected cartridge at the surface;
after selection of a cartridge, orienting the dispenser tool relative to the surface such that the nozzle of the corresponding selected cartridge is at the surface and then activating the dispenser tool and dispensing the viscous material out of the nozzle of the selected cartridge.

3. The method according to claim 1, wherein the dispenser tool contains multiple cartridges of the type having a tubular wall and a nozzle at one end of the tubular wall and an end cap remote from the nozzle configured and arranged slidable inside the tubular wall and for pushing the slidable cap towards the nozzle to expel viscous material from inside the cartridge out through the nozzle; wherein the dispenser tool includes at least one dispenser actuator configured and arranged for driving a rod against and with the end cap for pushing the end cap towards the nozzle under control of the at least one dispenser actuator;

wherein the method further includes activating the at least one dispenser actuator and driving the end cap towards the nozzle with the rod and providing viscous material onto the surface from the selected cartridge while moving the nozzle along the surface.

4. The method according to claim 3, wherein the cartridges are arranged stationary in the dispenser tool and the dispenser tool further includes a dispenser actuator for each cartridge and is configured for selectively driving a particular dispenser actuator for dispensing viscous material from the selected cartridge while the other dispenser actuators are not activated;

wherein the method further includes activating only one of the dispenser actuators after selection of the corresponding cartridge and expelling viscous material only from the selected cartridge onto the surface.

5. The method according to claim 3, wherein the dispenser tool further includes a moving mechanism configured and arranged for moving the selected cartridge in the dispenser tool from an inactive position to an active position, wherein the dispenser tool is prevented from dispensing viscous material from the selected cartridge in the inactive position, and
wherein the selected cartridge is configured and arranged to align with the dispenser actuator only in the active position for dispensing viscous material from the selected cartridge; and
wherein the method further includes, after selection of a cartridge that is in an inactive position, moving the selected cartridge from the inactive position to the active position and then activating the dispenser actuator and dispensing viscous material from the selected cartridge.

6. The method according to claim 1, wherein the method further includes bringing the nozzle of the selected cartridge into the vicinity of the surface and orienting the dispenser tool relative to the surface by the arm such that the nozzle of the corresponding selected cartridge is closer to the surface than the nozzles of the other cartridges in the dispenser tool.

7. The method according to claim 1, wherein the base includes a base attachment device configured and arranged for securing the base stationary to the surface by contact of the base attachment device with the surface, and wherein the method further includes attaching the base stationary to the surface and moving the remote end of the arm with the dispenser tool relative to the base and relative to the surface and dispensing the viscous material along the surface.

8. The method according to claim 1, wherein said activating the dispenser tool and providing viscous material onto the surface only from the selected cartridge further comprise moving the nozzle of the selected cartridge along the surface.

9. A system for working a surface below an anchor location at an operation site, wherein the operation site is a wind turbine with a wind turbine blade, and the surface is a surface of the wind turbine blade;

wherein the system comprises:
an unmanned robot, wherein the robot comprises a base and an arm extending from the base, the arm comprising a remote end configured for movement of the remote end relative to the base; and
a dispenser tool attached to the remote end of the arm and configured for dispensing viscous material on the surface; wherein the dispenser tool is configured and arranged to hold multiple cartridges containing viscous material, each cartridge having a respective nozzle;
wherein the system is configured for
locating the robot at the surface;
selecting at least one of the multiple cartridges in the dispenser tool for dispensing viscous material from the selected cartridge;
bringing the nozzle of the selected cartridge into the vicinity of the surface by the arm and orienting the dispenser tool relative to the surface such that the nozzle of the corresponding selected cartridge is at the surface, and
activating the dispenser to provide viscous material onto the surface from the selected cartridge while moving the nozzle along the surface.

10. The system according to claim 9, wherein the dispenser tool includes a cartridge housing in which the cartridges are arranged with the respective nozzles side-by-side; and wherein the unmanned robot is configured in at least one active dispensing orientation of the dispenser tool relative to the surface for any selected cartridge; wherein in the active dispensing orientation, the nozzle of the selected cartridge is at the surface.

11. The system according to claim 9, wherein the multiple cartridges have a tubular wall, a nozzle at one end of the tubular wall, and an end cap remote from the nozzle configured and arranged slidable inside the tubular wall and for expelling viscous material out of the cartridge through the nozzle when the end cap is pushed towards the nozzle;

wherein the dispenser tool includes at least one dispenser actuator configured and arranged for driving a rod of the at least one dispenser actuator against and with the end cap towards the nozzle;
wherein the system is configured for activating the at least one dispenser actuator and driving the end cap towards the nozzle with the rod and providing viscous material onto the surface from the selected cartridge while moving the nozzle along the surface.

12. The system according to claim 11, wherein the cartridges are arranged stationary in the dispenser tool and the dispenser tool includes dispenser actuators for each cartridge and is configured for selectively driving a particular dispenser actuator for the selected cartridge while the other dispenser actuators are not activated.

13. The system according to claim 11, wherein the dispenser tool includes a moving mechanism configured and arranged for moving the selected cartridge in the dispenser tool from an inactive position to an active position, wherein the dispenser tool is prevented from dispensing viscous material from the selected cartridge in the inactive position, and wherein the selected cartridge is aligned with the dispenser actuator only in the active position for dispensing viscous material from the selected cartridge.

14. The system according to claim 9, wherein the base includes a base attachment device configured and arranged for securing the base stationary to the surface by contact of the base attachment device with the surface.

15. A system for at least one of inspecting and working a surface of a wind turbine blade of a wind turbine, the system comprises:
   an unmanned robot including a base and an arm extending from the base, the arm having a remote end configured for movement relative to the base;
   a dispenser tool attached to the remote end of the arm and configured for dispensing viscous material on the surface of the wind turbine blade, wherein the dispenser tool is configured and arranged to hold multiple cartridges containing viscous material, each cartridge having a respective nozzle;
   wherein the system is configured for
   locating the robot at the surface;
      selecting at least one of the multiple cartridges in the dispenser tool for dispensing viscous material from the selected cartridge;
      bringing the nozzle of the selected cartridge into the vicinity of the surface by the arm and orienting the dispenser tool relative to the surface such that the nozzle of the corresponding selected cartridge is at the surface,
      activating the dispenser and providing viscous material onto the surface from the selected cartridge while moving the nozzle along the surface.

16. A dispenser tool for dispensing viscous material on a surface of a wind turbine blade, where the dispenser tool is configured to be attached to a remote end of an arm of an unmanned robot configured to be located at the surface of the wind turbine blade, the dispenser tool comprising:
   multiple cartridges of the type comprising a tubular wall;
   a nozzle at one end of the tubular wall;
   an end cap remote from the nozzle, and configured and arranged to be slidable inside the tubular wall and to push the slidable cap towards the nozzle for expelling viscous material out of the cartridge through the nozzle when the dispenser nozzle is in contact with the surface or so close to the surface that the dispensed viscous material is dispensed directly onto the surface from the nozzle; and
   at least one dispenser actuator configured and arranged for driving a rod against and with the end cap for pushing the end cap towards the nozzle under control of the dispenser actuator.

17. The dispenser tool according to claim 16, wherein the dispenser tool further includes
   a cartridge housing in which the cartridges are arranged stationary with the respective nozzles side-by-side, and
   a dispenser actuator for each cartridge which is configured for selectively driving a particular dispenser actuator for the selected cartridge while the other dispenser actuators are not activated.

18. The dispenser tool according to claim 16, wherein the dispenser tool further includes a moving mechanism configured and arranged for moving the selected cartridge in the dispenser from an inactive position to an active position, wherein the dispenser is prevented from dispensing viscous material from the selected cartridge in the inactive position, and wherein the selected cartridge is aligned with the dispenser actuator only in the active position for dispensing viscous material from the selected cartridge.

* * * * *